(12) United States Patent
Zygerman

(10) Patent No.: US 7,161,114 B2
(45) Date of Patent: Jan. 9, 2007

(54) LASER CUTTING INSTALLATION WITH PARTS UNLOADING UNIT

(75) Inventor: Leonid Zeygerman, West Hartford, CT (US)

(73) Assignee: Trumpf Inc., Farmington, CT (US)

(*) Notice: Subject to any disclaimer, the term of this patent is extended or adjusted under 35 U.S.C. 154(b) by 575 days.

(21) Appl. No.: 10/676,551

(22) Filed: Oct. 1, 2003

(65) Prior Publication Data

US 2006/0169681 A1    Aug. 3, 2006

(51) Int. Cl.
B23K 26/02 (2006.01)

(52) U.S. Cl. .................... 219/121.82; 219/121.67; 219/121.72; 219/121.6

(58) Field of Classification Search ........... 219/121.82, 219/121.67, 121.72, 121.6
See application file for complete search history.

(56) References Cited

U.S. PATENT DOCUMENTS

| | | | |
|---|---|---|---|
| 3,226,527 A | 12/1965 | Harding | |
| 3,855,445 A | 12/1974 | Jungle | |
| 4,316,073 A | 2/1982 | Lemelson | |
| 4,656,713 A | 4/1987 | Rosa et al. | |
| 4,677,734 A | 7/1987 | Bloch et al. | |
| 4,698,480 A | 10/1987 | Klingel | |
| 4,851,637 A * | 7/1989 | Puozzo et al. | 219/121.78 |
| 4,931,615 A | 6/1990 | Muncy et al. | |
| 5,109,148 A * | 4/1992 | Fujita et al. | 219/121.82 |
| 5,192,848 A | 3/1993 | Miyakawa et al. | |
| 5,310,991 A | 5/1994 | Franco | |
| 5,359,175 A | 10/1994 | Miyagawa et al. | |
| 5,373,136 A | 12/1994 | Ernst et al. | |
| 5,439,431 A | 8/1995 | Hessbruggen et al. | |
| 5,481,083 A | 1/1996 | Smyth, Jr. | |
| 5,637,243 A | 6/1997 | Sato et al. | |
| 5,744,778 A | 4/1998 | Kash et al. | |
| 5,885,199 A | 3/1999 | Shao | |
| 5,901,938 A | 5/1999 | Mosca et al. | |
| 5,989,374 A | 11/1999 | Bull et al. | |
| 6,013,895 A | 1/2000 | Steadman | |
| 6,046,428 A * | 4/2000 | Serruys | 219/121.67 |
| 6,163,010 A | 12/2000 | Kobsa | |
| 6,213,704 B1 | 4/2001 | White et al. | |
| 6,233,538 B1 | 5/2001 | Gupta et al. | |
| 6,243,611 B1 | 6/2001 | Hazama et al. | |
| 6,277,319 B1 | 8/2001 | Hardgrove et al. | |
| 6,433,342 B1 | 8/2002 | Cordts, III et al. | |
| 6,445,971 B1 | 9/2002 | Gottschalk et al. | |

(Continued)

FOREIGN PATENT DOCUMENTS

JP    59-190116    10/1984

(Continued)

*Primary Examiner*—M. Alexandra Elve

(57) ABSTRACT

A machine tool installation for laser cutting of sheet metal workpieces includes a workpiece support having a multiplicity of parallel spaced grid elements providing the upper surface thereof, and a machine frame having a generally vertical rear wall and an arm extending therefrom over the workpiece support, and upon which is supported a laser cutting unit with a laser cutting head, said grid elements of said workpiece support extending perpendicularly to said vertical wall of said machine frame. An unloading unit is provided to lift the cut parts from the workpiece support and transport them to a discharge station. In the unit a frame movably supports a pair of opposed fork assemblies which move between open and closed positions. These fork assemblies are spaced apart in the open position and have their opposed ends in adjacent relationship in the closed position, and they are movable vertically to enable the forks to be moved between the grid elements to pick up the parts.

12 Claims, 16 Drawing Sheets

U.S. PATENT DOCUMENTS 6,452,195 B1 9/2002 Smick et al.
6,472,253 B1 10/2002 Bothra

FOREIGN PATENT DOCUMENTS

| | | |
|---|---|---|
| JP | 5990116 | 10/1984 |
| JP | 10203642 | 8/1998 |
| JP | 2001-105182 | 4/2001 |
| JP | 2001105180 | 4/2001 |
| JP | 2002-184789 | 6/2002 |
| JP | 2002184789 | 6/2002 |

* cited by examiner

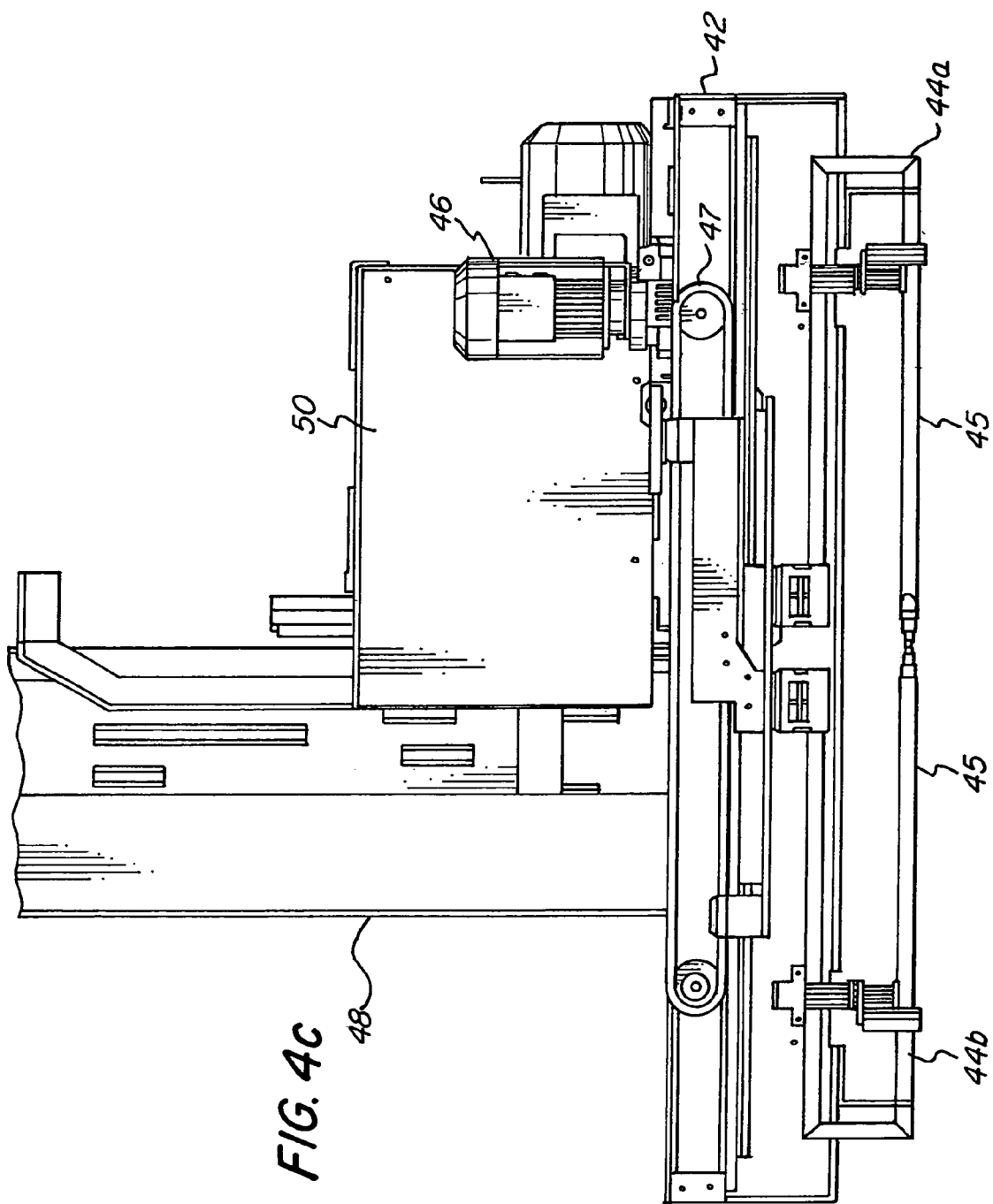

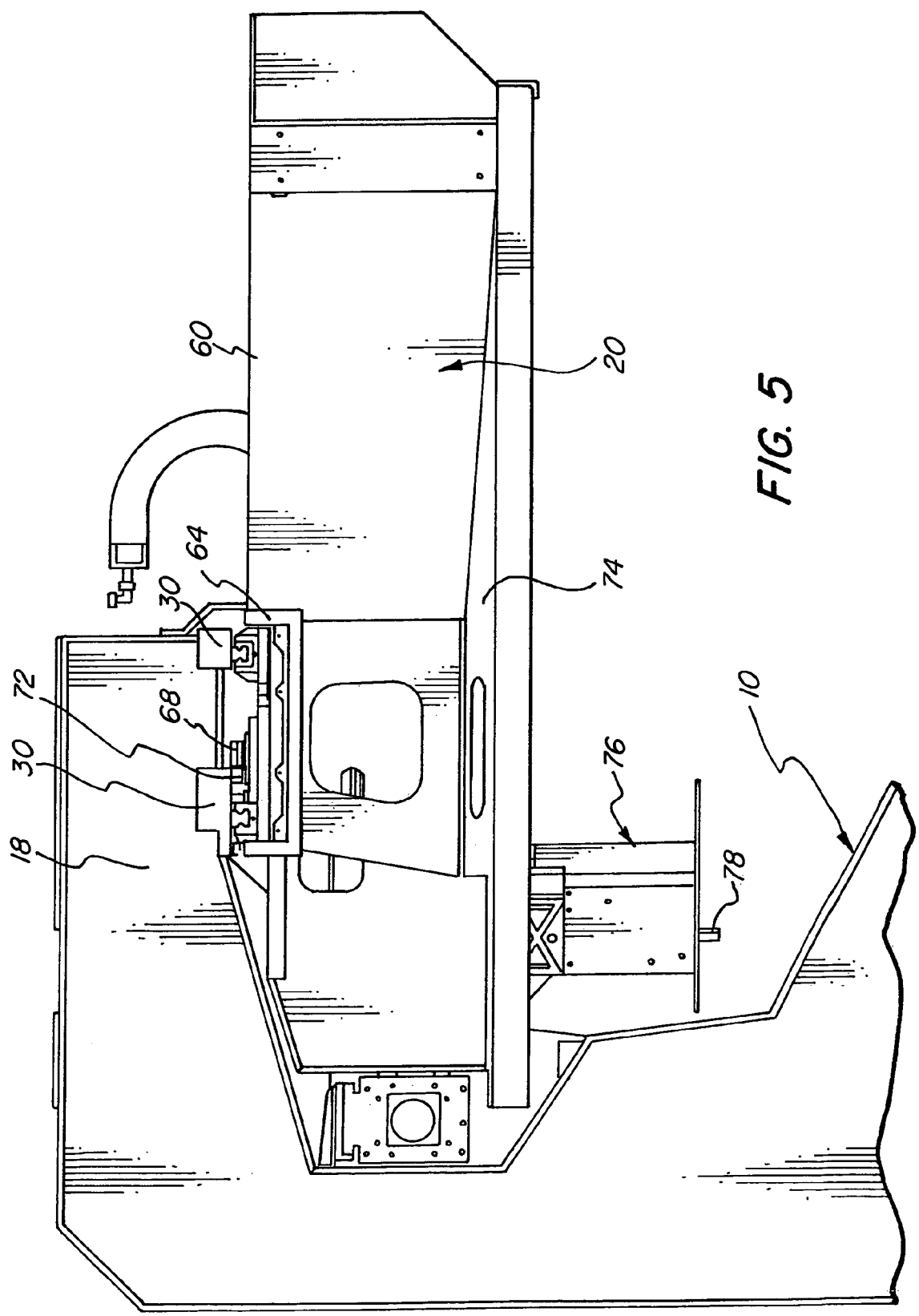

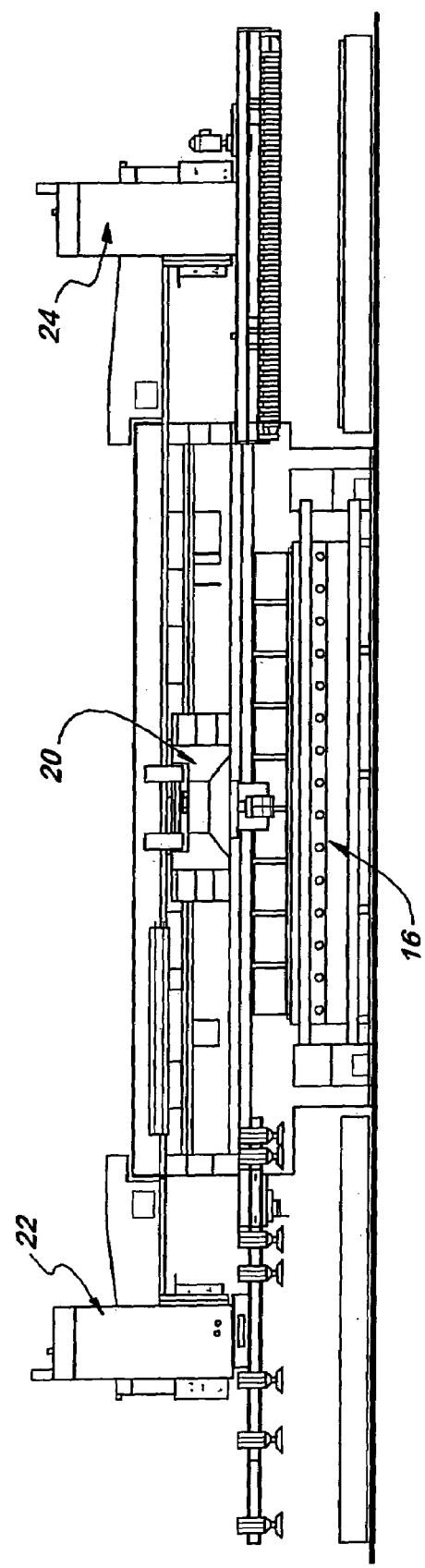

LASER CUTTING INSTALLATION WITH PARTS UNLOADING UNIT

BACKGROUND OF THE INVENTION

The present invention relates to laser cutting installations in which the parts and skeleton of the processed sheet material workpieces are unloaded automatically.

Laser cutting machines are now widely employed for processing of sheet metal workpieces since the laser will cut the sheet metal rapidly and the laser beam and/or the workpiece can be moved by a guidance system to enable precise cutting of parts. One type of common laser cutting machine for processing large sheet metal workpieces has a work support over which there is a movable bridge, and the laser cutting head is supported on the bridge. The bridge can be moved along the workpiece support to effect cutting of the workpiece in the longitudinal direction, and the laser cutting head can be moved along the bridge to effect cutting in the transverse direction. Illustrative of such machines is Erlenmaier U.S. Pat. No. 6,586,706 and Kilian U.S. Pat. No. 5,304,773.

Loading machines for the sheet metal workpieces have been widely employed for punch presses and laser cutting machines and generally involve suction devices which are arranged in a grid that can be adapted to the size of the sheet metal workpieces to be picked up and carried by the loading device. Generally, such loading devices will pick up the sheet metal and then rotate or otherwise move to deposit the sheet on the workpiece support in the desired position. Illustrative of such loading devices is that illustrated and described in Leibinger et al U.S. Pat. No. 6,066,531.

The cutting operation will frequently produce numerous small parts and a skeleton which must be removed from the workpiece support. Although the operator may remove and sort them manually, this extends the processing time and reduces the productivity of the laser cutting machine. Accordingly, various types of units have also been provided for removing from the workpiece support the cut parts and skeleton. It has also been proposed to leave small webs of material retaining the cut parts in the skeleton so that the cut workpiece can be lifted as a unit by a suction arrangement; the remaining webs are then broken to release the parts from the skeleton after it has been transported to a separation station.

Typically, the workpiece support has a grid formed by two superposed layers of metal slats arranged on their sides on end with the slats in each layer being parallel and the slats of one layer being perpendicular to those of the other layer. Use of a pick up device with a grid of suction devices to pick up the parts and skeleton requires relatively complex programming to actuate the suction devices over each part and an unbroken surface area of the skeleton.

It is an object of the present invention to provide a novel laser cutting installation including a movable unloading unit for picking up the cut parts and skeleton from the workpiece support and transporting them to a discharge station.

It is also an object to provide such a laser cutting installation which can be fabricated relatively readily and which is simple to operate.

SUMMARY OF THE INVENTION

It has now been found that the foregoing and related objects may be readily attained in a machine tool installation for laser cutting of sheet metal workpieces comprising a workpiece support having a multiplicity of parallel spaced grid elements providing the upper surface thereof, and a machine frame having a generally vertical rear wall and an arm extending therefrom over the workpiece support. The grid elements of the workpiece support extend perpendicularly to the vertical wall of the machine frame. A laser cutting unit is supported on the arm of the machine frame and includes a laser cutting head which is movable in X and Y axes over the workpiece support to cut parts from a sheet metal workpiece disposed thereon.

An unloading unit for lifting the cut parts from the workpiece support and transporting them to a discharge station includes a frame movably supporting a pair of opposed fork assemblies, a fork housing supporting the frame and enclosing a drive assembly for moving the fork assemblies between open and closed positions. The fork assemblies are spaced apart in the open position and have their opposed ends in adjacent relationship in the closed position. The unloading unit also has a support housing on which the fork housing is mounted for vertical movement, and drive means for effecting vertical movement of the fork housing relative to the machine frame and the workpiece support. The unloading unit is movable between an operative position adjacent the workpiece support and the discharge station. Drive means is provided for moving the unloading unit between the operative position and discharge station, and a controller is operable to move the unloading unit between the discharge station and said operative position, move the fork assemblies into the open position, move the fork housing downwardly to position the fingers for movement into the spacing between the grid elements, move the fork assemblies into the closed position below the upper surface of the workpiece support, move the unloading unit upwardly to lift the cut parts and skeleton from the workpiece support, and discharge the parts and skeleton on the unloading unit at the discharge station.

The fork assemblies are comprised of a multiplicity of forks of generally C-shaped configuration and cooperatively dimensioned to move into the spacing between the grid elements and below the parts and skeleton on the upper surface of the grid elements. The drive assembly includes a motor and a chain drive connected to the fork assemblies. The parts and skeleton on deposited at the discharge station by moving the fork assemblies into the open position.

The vertical rear wall of the frame has a multiplicity of recesses therein opening adjacent the workpiece support and into which one fork assembly is movable when the fork assemblies are moved into their open position. The open position enabling the fork assemblies to be moved downwardly on opposite sides of the workpiece support to a position in which the forks can move between the grid elements when the fork assemblies are moved into the closed position.

BRIEF DESCRIPTION OF THE ATTACHED DRAWINGS

FIG. 4c is an enlarged cross sectional view of the operative portion of the unloading unit illustrating the drive mechanism for moving the fork assemblies;

FIG. 5 is a side elevational view drawn to an enlarged scale of the motion unit in FIG. 1;

Figure 8A:
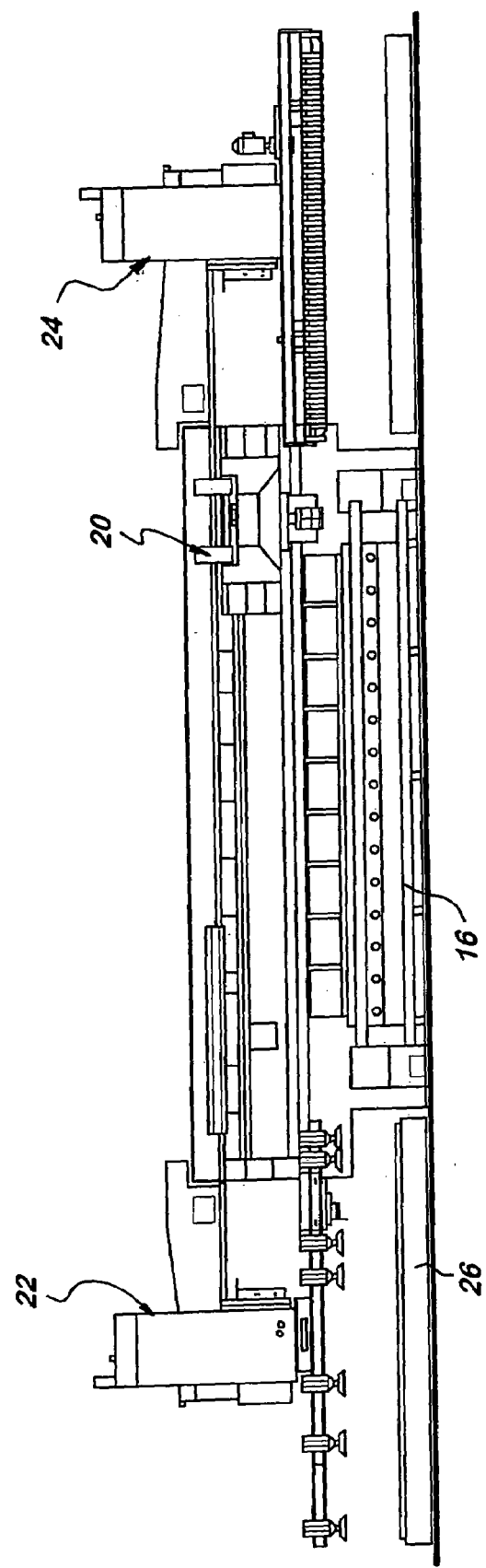
FIG. 8a is a view of the principal operating components of the laser cutting machine in the position for coupling the unloading unit to the motion unit and with the loading unit uncoupled.
Figure 9A:
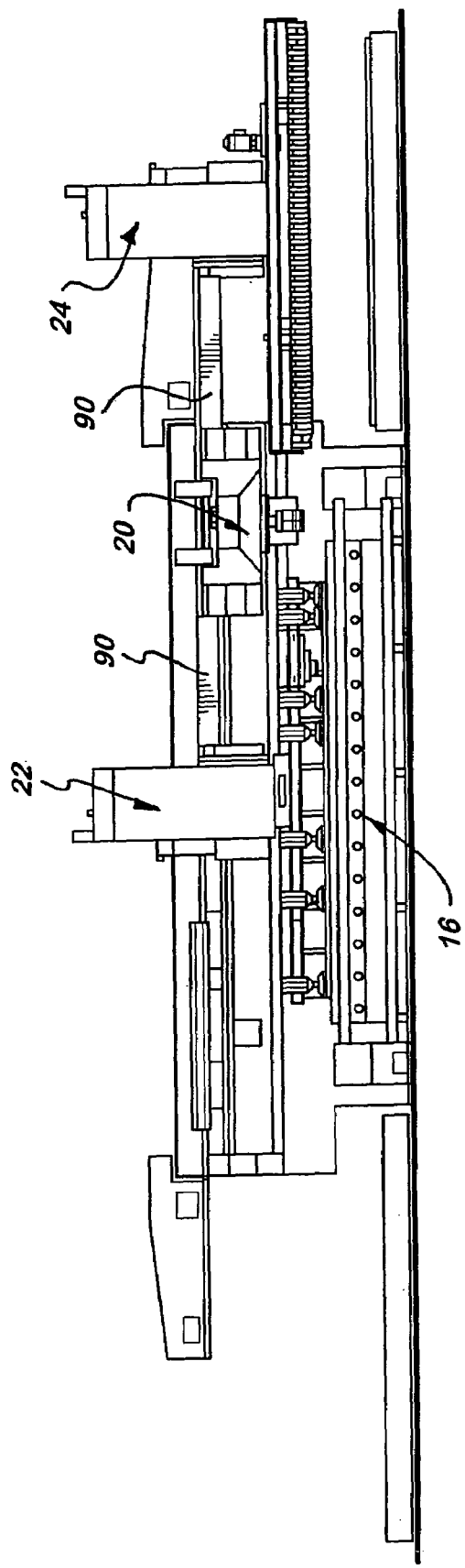
Figure 9B:
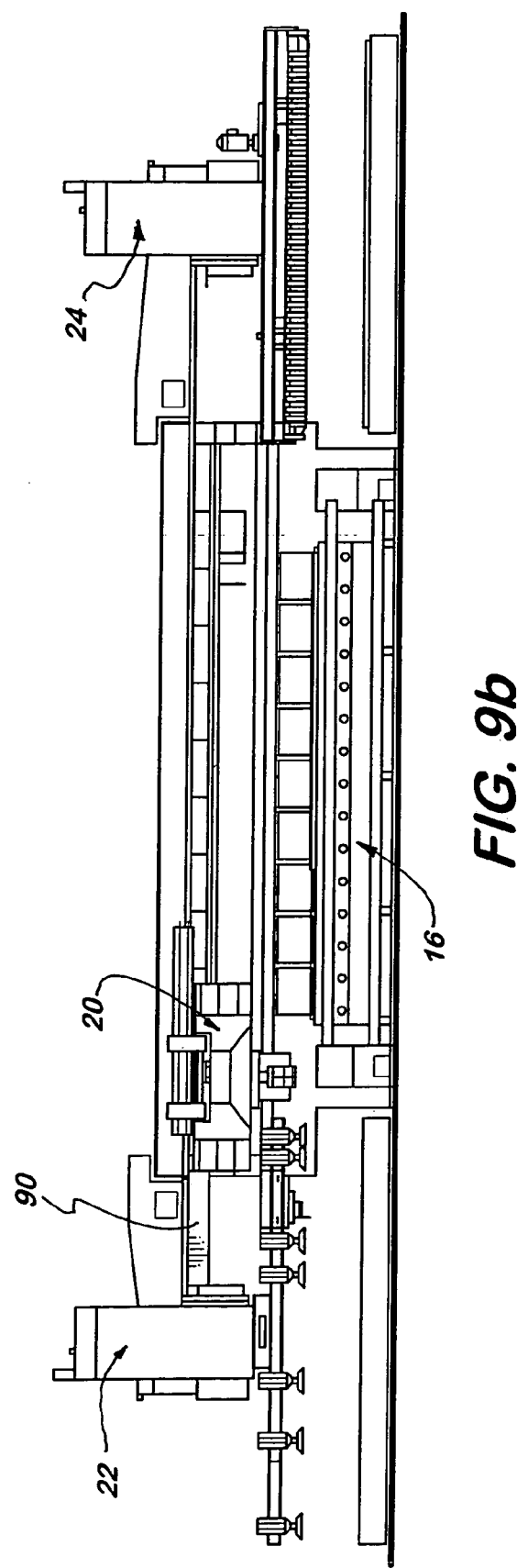

FIG. 8e is a similar view of the motion unit in position for laser cutting and with the loading and unloading units latched in their home positions; and FIG. 9a is a front elevational view of the laser cutting machine diagrammatically showing the coupling devices on both the loading and unloading units coupled to the motion unit; and FIG. 9b shows only the loading unit coupling device coupled to the motion unit.

BRIEF DESCRIPTION OF THE ILLUSTRATED EMBODIMENTS

Figure 1:
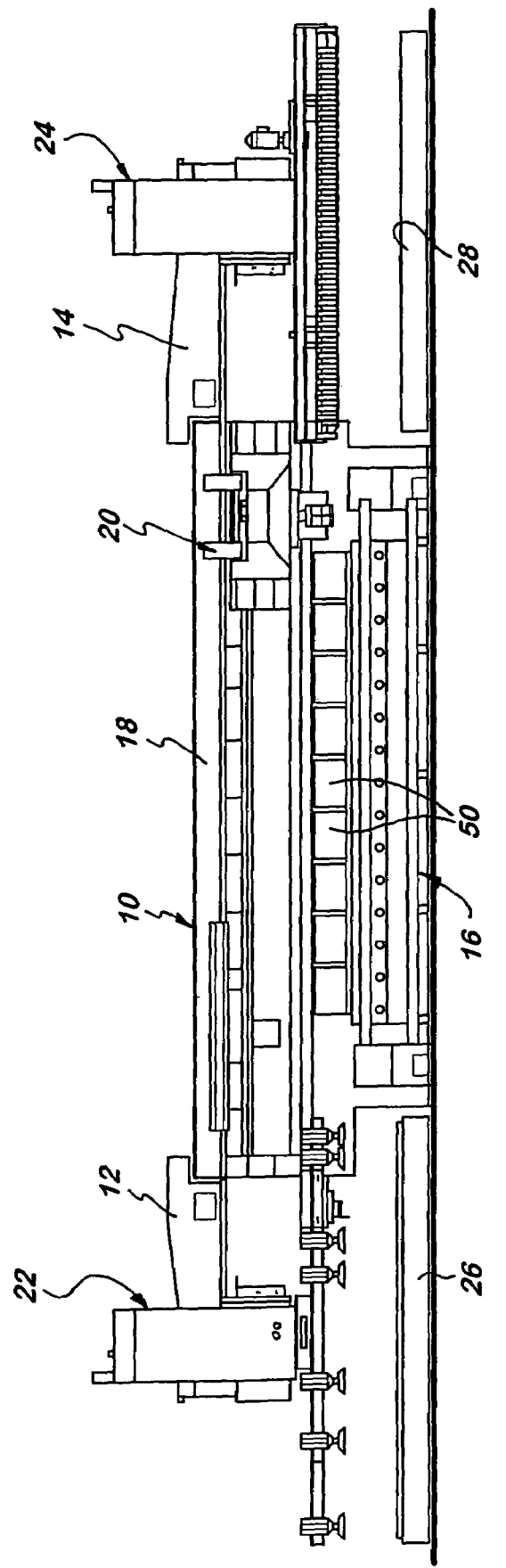
FIG. 1 is a front elevational view of a laser cutting machine embodying the present invention and with both the loading and unloading units being shown in their home positions.

Turning first to FIG. 1, a laser cutting machine embodying the present invention has an elongated C-shaped frame generally designated by the numeral 10 with cantilevered extensions 12, 14 at each end thereof. Centrally of the frame 10 is a workpiece support table generally designated by the numeral 16. Movably supported on the upper arm 18 of the machine frame 10 is a motion unit generally designated by the numeral 20.

Shown in its home position supported on the extension 12 is a loading unit generally designated by the numeral 22, and supported on the extension 14 is an unloading unit generally designated by the numeral 24. Below the loading unit 22 is a stack 26 of sheet metal workpieces and below the unloading unit 24 is a platform upon which cut parts and sheet metal skeletons 28 are deposited by the unloading unit 22.

The motion unit 20, loading unit 22 and unloading unit 24 are all reciprocatably supported on tracks 30 on the lower surfaces of the upper arm 32 of the machine frame 10 and of the extensions 12, 14.

Figure 2:
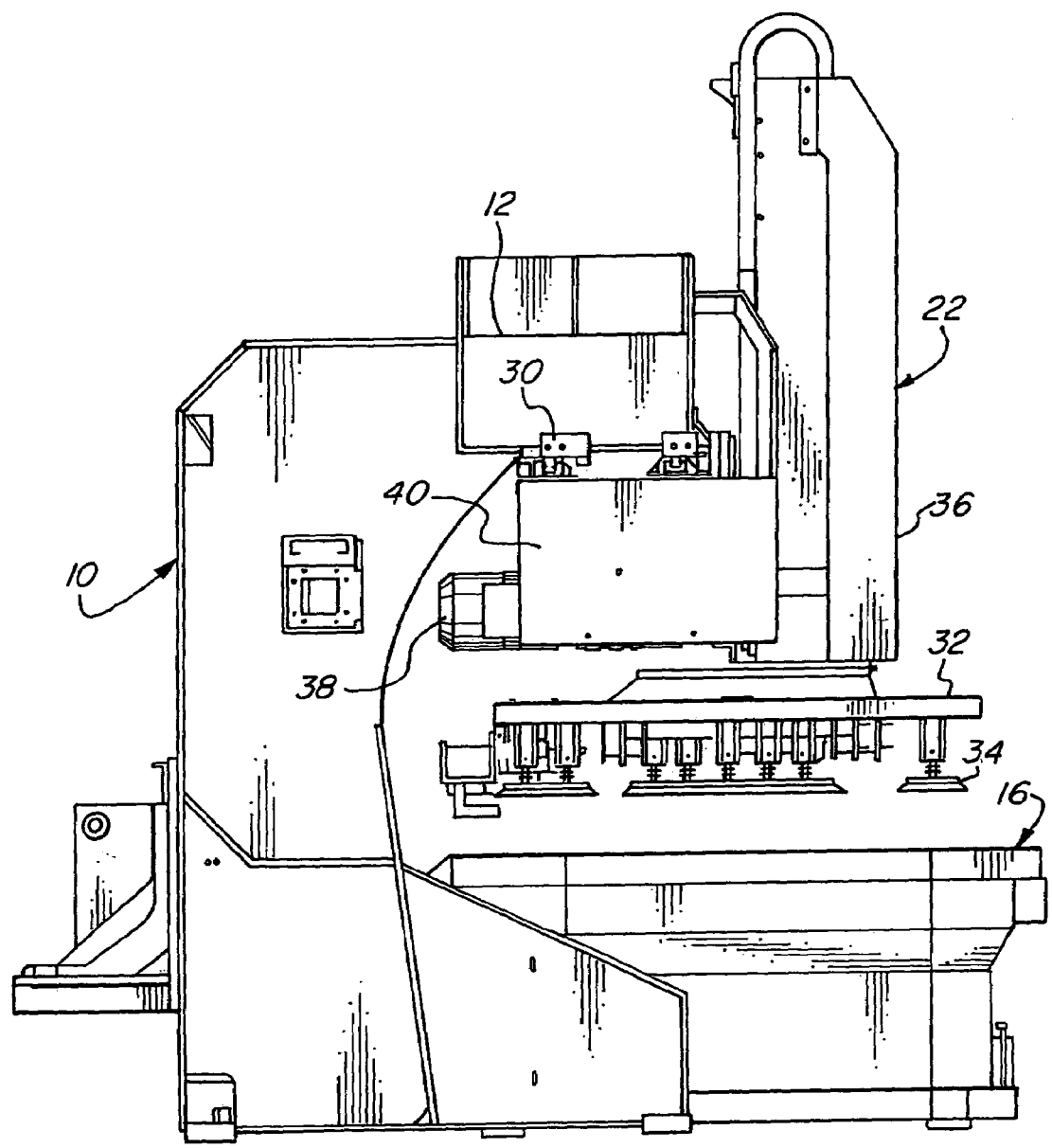
FIG. 2 is an end elevational view of the loading unit end of the machine of FIG. 1 and drawn to an enlarged scale.

Turning first in detail to the loading unit 22 as seen in FIG. 2, it has a carrier frame 32 which supports a large number of suction cups 34 in a grid pattern and these are individually connected to a suction or vacuum source (not shown). The carrier frame 32 is supported on the housing 36 which can be moved upwardly and downwardly by a computer controlled motor 38 supported in the housing 40 and a chain mechanism (not shown). As is conventional, the housing 36 contains computer controlled valves which enable selective activation of only those suction cups necessary to pick up, lift and carry a workpiece 26 from the stack thereunder. The housing 40 is supported on the tracks 30.

Figure 3:
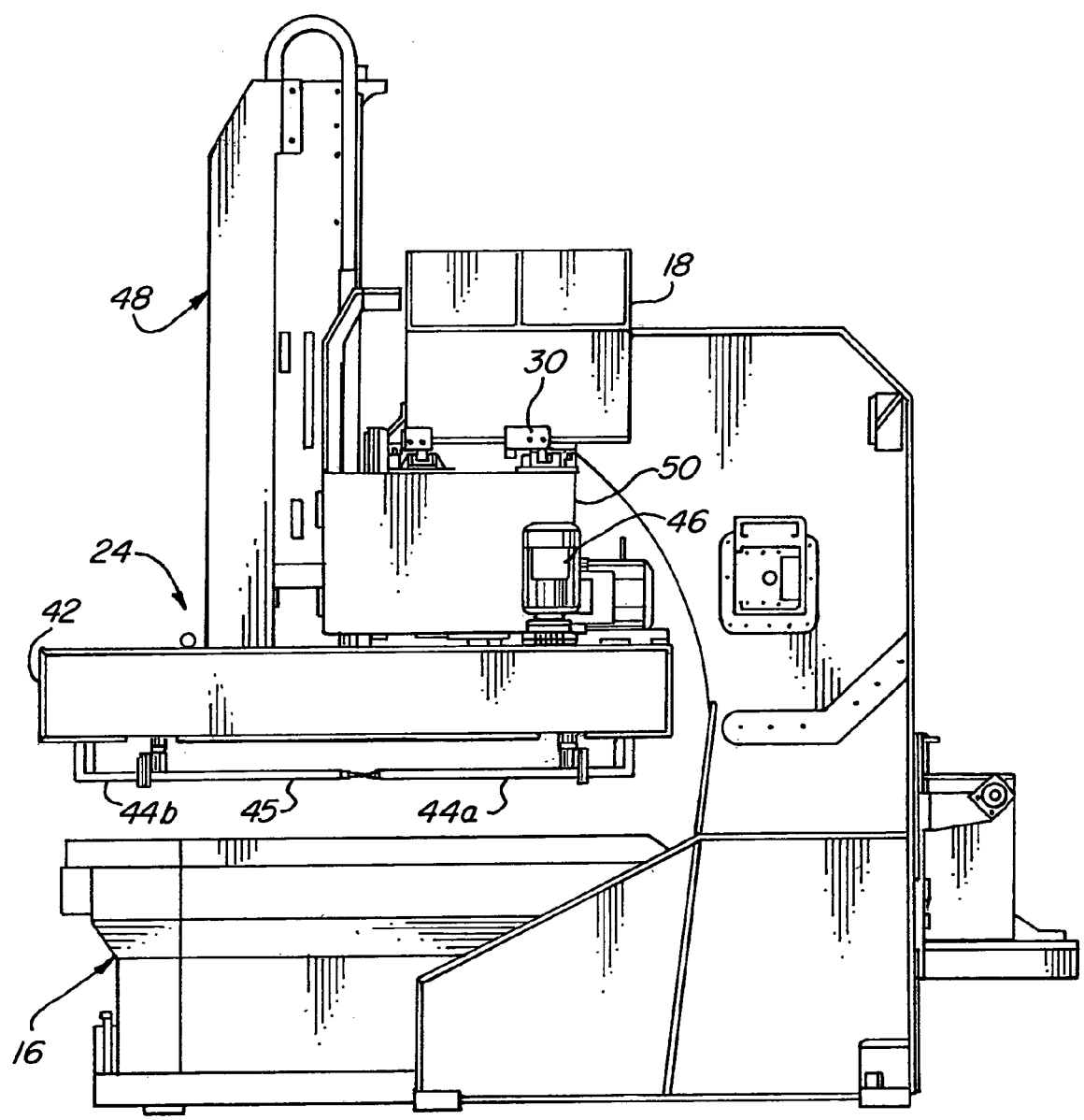
FIG. 3 is an end elevational view of the unloading unit end of the laser cutting machine and drawn to an enlarged scale.
Figure 4A:
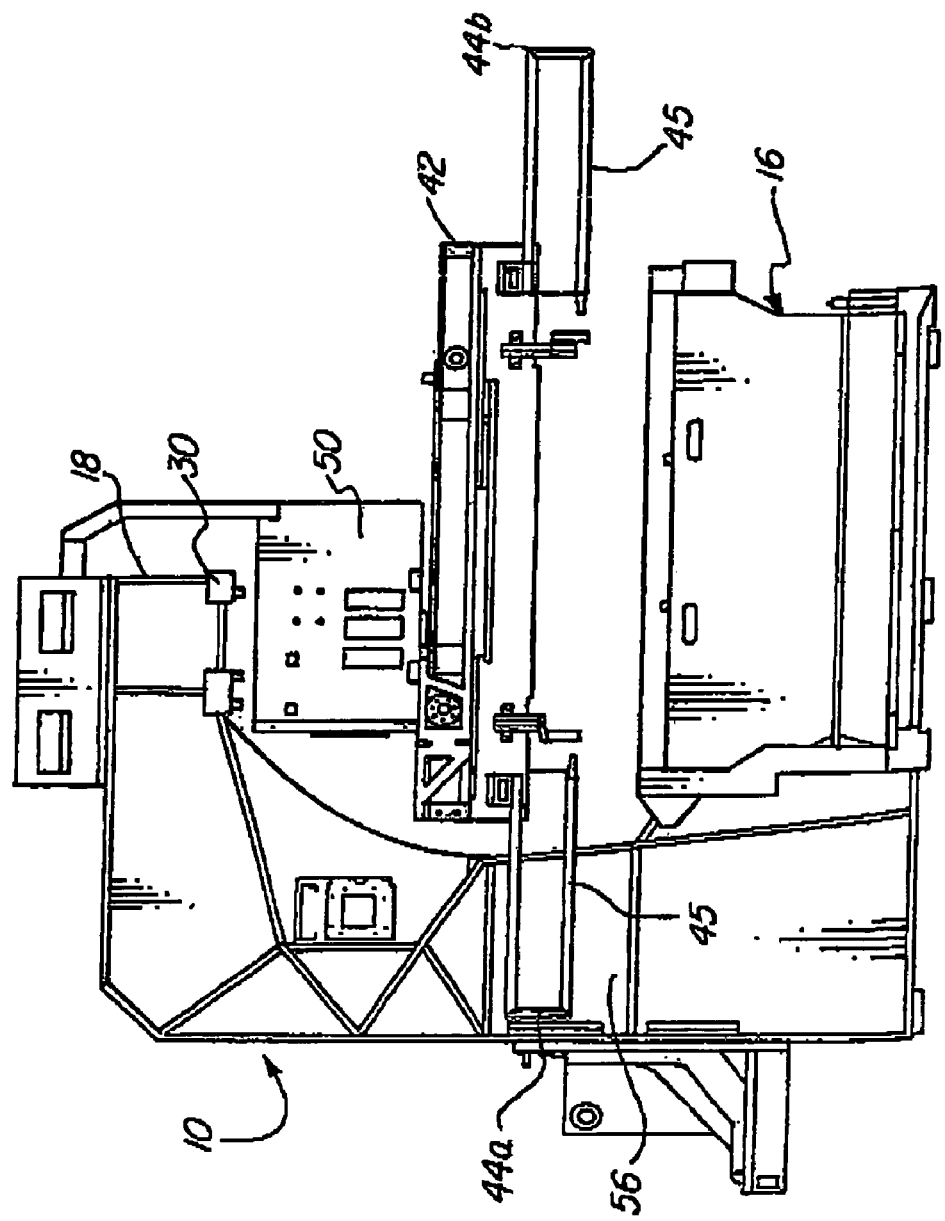
FIG. 4a is a view of the unloading unit with the forks opened to allow the unloading unit to move downwardly to pick up the cut parts and skeleton from the top surface of the workpiece support table.
Figure 4B:
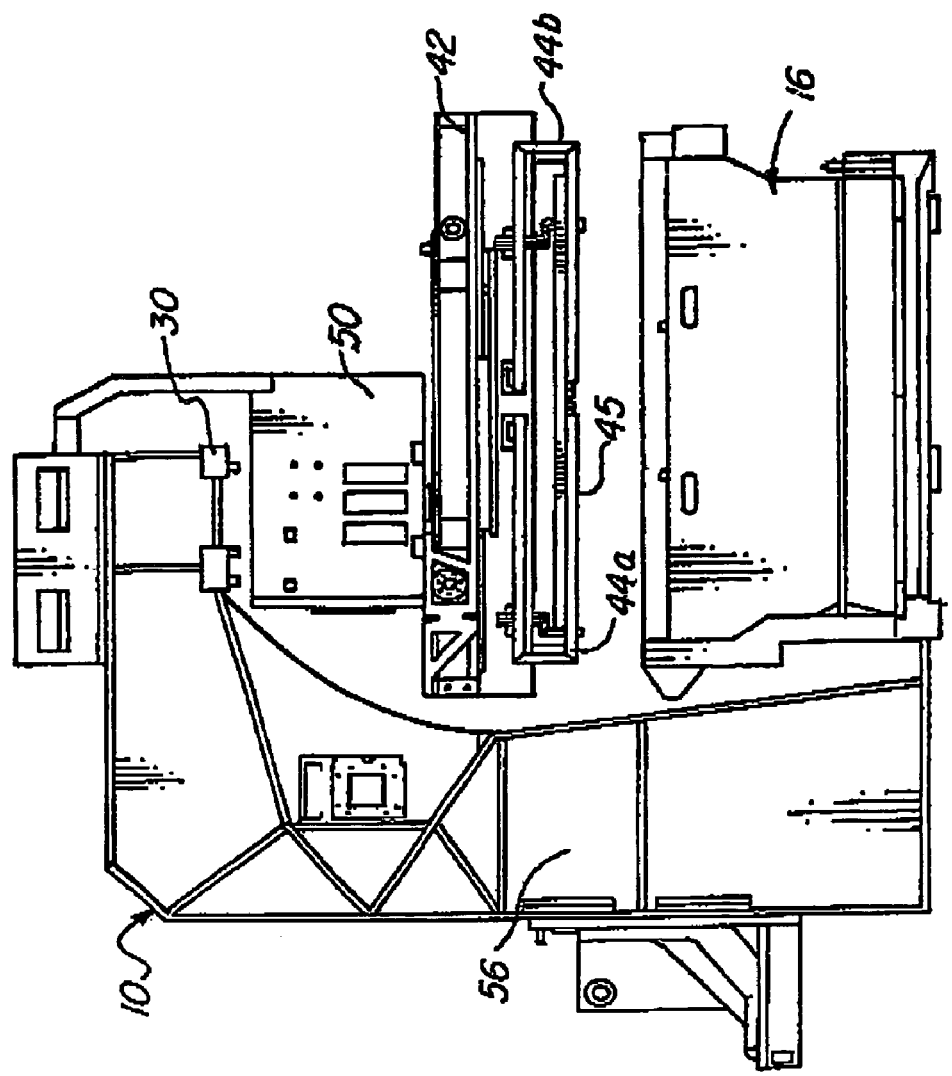
FIG. 4b is a cross sectional view of the laser cutting machine showing the unloading unit after it has picked up the parts and skeleton from the workpiece support table.

Turning next to the unloading unit 24 as seen in FIGS. 3, 4a and 4b, a frame 42 which reciprocatably supports opposed fork assemblies 44 comprised of a multiplicity of individual, parallel forks 45 of generally C-shaped configuration. These fork assemblies 44a, 44b are reciprocated between an open position shown in FIG. 4a and a closed pickup position shown in FIG. 4b. This motion is effected by a drive motor 46 on the frame 42 and a drive chain 47 connected to the fork assemblies 44a, 44b. The frame 42 is supported on the housing 48 which is movable vertically on the housing 50 which is movable longitudinally of the machine frame 10 on the tracks 30.

For movement on the machine frame 10 from its home position seen in FIG. 1 to its pickup location, the fork assemblies 44a, 44b are in the position shown in FIG. 4b. After the unloading unit 24 has been moved to the pick up location over the workpiece support table 16, the fork assemblies 44a, 44b are moved into their open position shown in FIG. 4a. This enables the frame 42 and fork assemblies 44a, 44b to move downwardly into the pickup position. To enable the closed ends of the fork assemblies 44a, 44b and the forks 45 to be moved outwardly of the support grid 52 of the workpiece support table 16, the vertical wall 54 of the machine frame 10 has a series of horizontally spaced recesses 56 into which the closed end of the fork assembly 44a is moved. The closed end of the folk assembly 44b is also moved outwardly of the support grid 52. This allows the inner ends of the forks 45 to clear the grid 52 of the downwardly until the forks 45 are disposed below the top surface of the support grid 52 on the workpiece support table 16. The motor 46 is then actuated to move the fork assemblies 44a, 44b to their closed position below the parts and skeletons 28 on the grid 52. The drive motor (not shown) for the vertical motion of the housing 48 and frame 42 is then actuated to lift the parts and skeleton 28 from the grid 52 and move the frame 42 to the elevated position seen in FIG. 4a so that the unloading unit 24 with the removed parts may be moved along the tracks 30.

Figure 6:
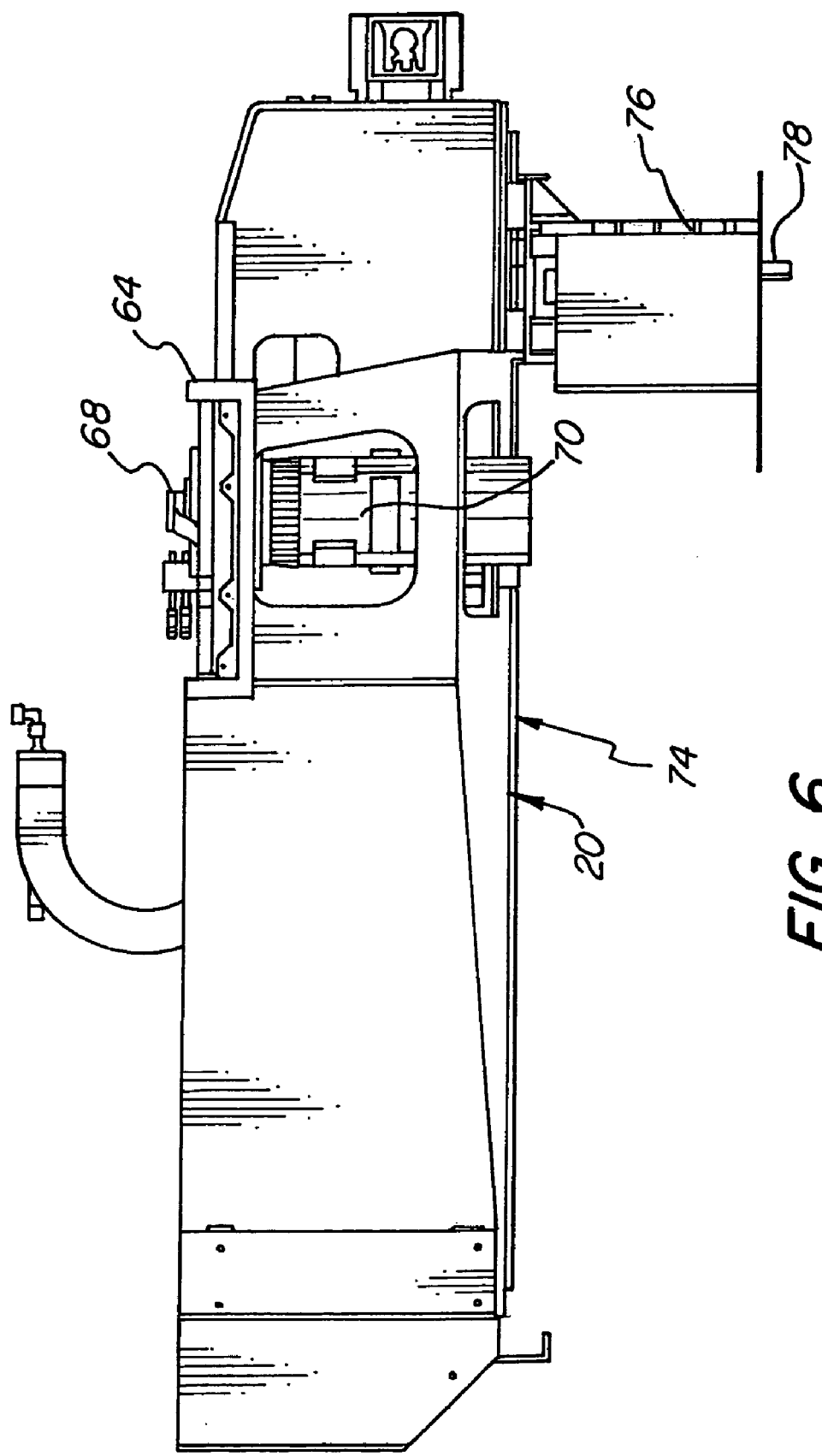
FIG. 6 is an elevational view of the other side of the motion unit of FIG. 1 as supported on the tracks on the machine frame.
Figure 7:
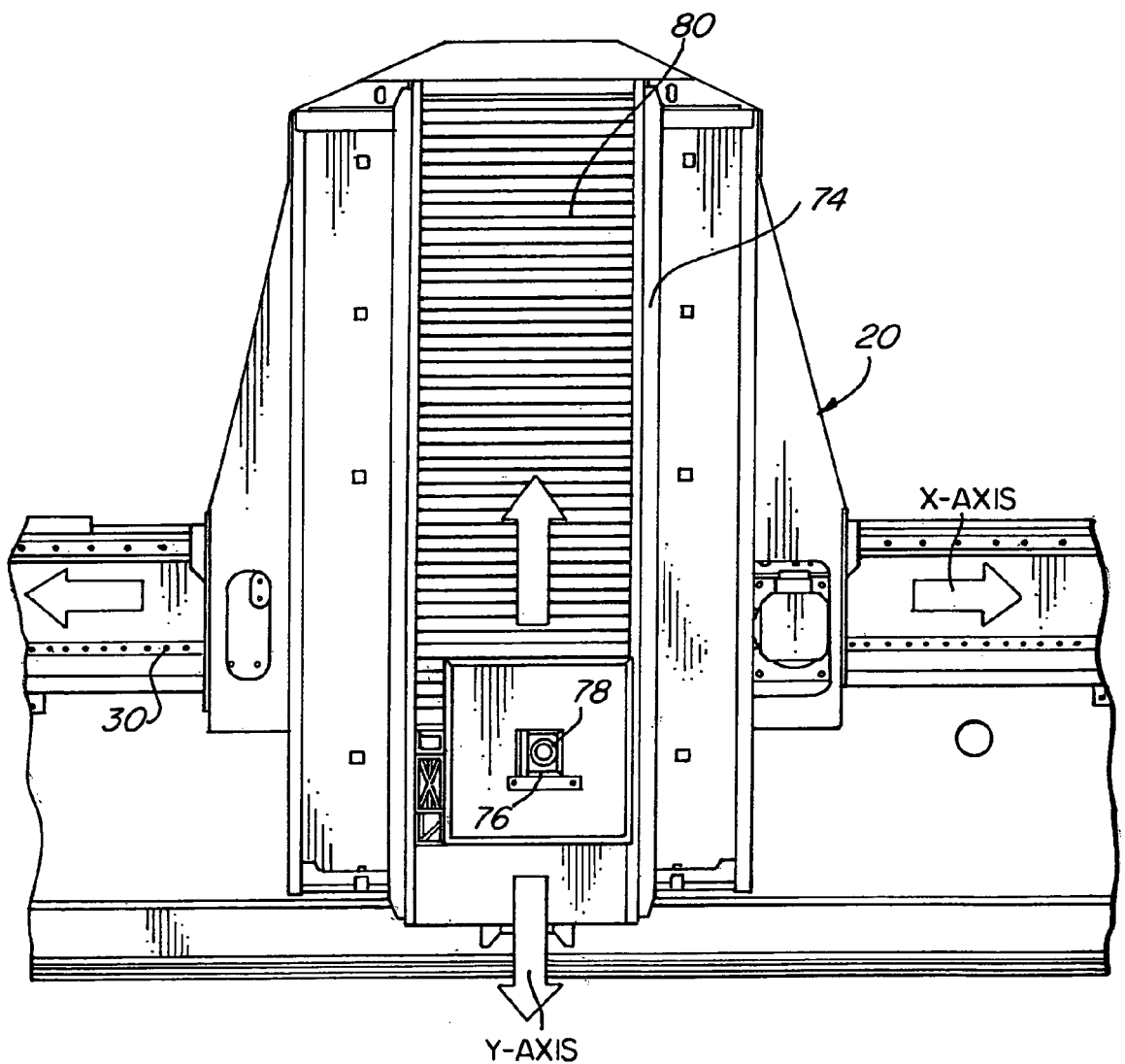
FIG. 7 is a bottom view of the motion unit showing the axes of movement of the cutting unit.

Turning next in detail to the motion unit 20 as seen in FIGS. 5–7, it has a housing generally designated by the numeral 60 and a machine track mounting plate 64 with carriages 66 which are supported on the tracks 30. A pinion 68 is driven by the bidirectional motor 70 and meshes with a rack 72 on the lower surface of the upper arm 18 of the machine frame 10 to effect movement of the motion unit along the tracks 30.

As seen in FIG. 7, the motion unit 20 with the laser cutting unit 76 moves along the tracks 30 to cut the workpiece in the X-axis and the laser cutting unit 76 moves on the tracks 74 of the motion unit 20 to cut in the Y-axis.

To correct the motion unit 20 to the loading and unloading units 22, 24, coupling devices 90 are provided on the loading and unloading units 22, 24. These are used not only to couple the motion unit 20 to the loading and unloading units 22, 24 but also to engage the machine frame 10 to retain the unit in its home position when uncoupled from the motion unit 20. The coupling device 90 will normally be engaged with the unloaded unit and snap into engagement with the motion unit 20. When the units 22, 24 are latched in the home position, the motion of the motion unit 20 away from the unit 22, 24 will unlatch the control unit from the coupling device 90.

Movably mounted on tracks 74 is a laser cutting unit generally designated by the numeral 76 and containing the laser cutting head 78. The laser cutting unit 76 is coupled to a bellows 80 (seen in FIG. 7). Optics supported on the machine frame 10 direct the laser beam along the machine frame 10 and then into the Y-axis beam bellows (not shown) and through another set of optics into the moving cutting unit 76 and the laser cutting head 78.

In the laser cutting unit is a motor (not shown) which rotates a pinion gear (not shown) to move the unit 76 along Y-axis 74. Also disposed in the cutting unit 76 is a second drive motor (not shown) to move the cutting head 78 vertically (Z-axis).

Also fragmentarily illustrated are various cables and hoses for operation of the motors and suction devices.

FIGS. 8*a*–8*e* illustrate the working cycle of the laser cutting machine of FIG. 1. As seen in FIG. 8*a*, the motion unit 20 has moved to pick up the empty unloading unit 24 which is latched in its home position.

Figure 8B:
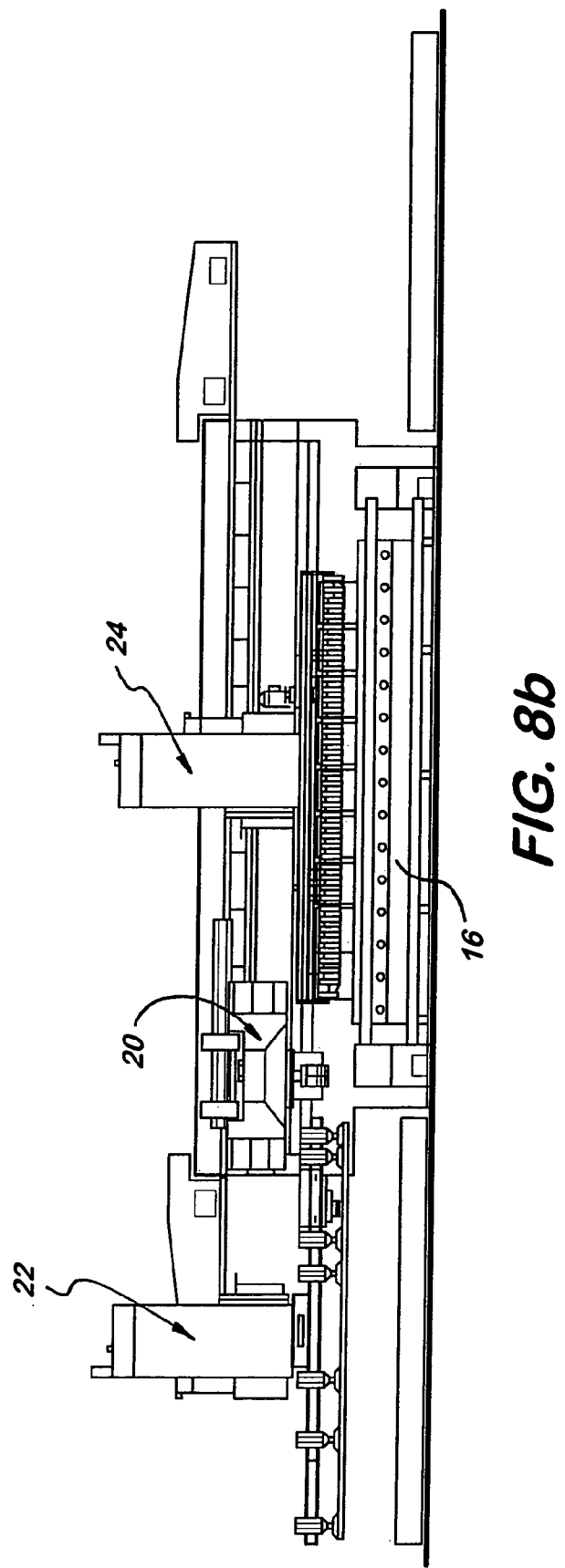
FIG. 8b is a similar view with the units shown in the position for unloading of the skeleton and cut parts from the workpiece support table and for coupling the loading unit to the motion unit.

Turning next to FIG. 8*b*, the motion unit 20 has now moved the unloading unit 24 into its operative position over the workpiece support table 16. At this point, the fork assemblies 44*a*, 44*b* are moved to their open position and the frame 42 with the fork assemblies 44*a*, 44*b* is moved downwardly to a position below the upper surface of the grid 52. The fork assemblies 44*a*, 44*b* are moved to their closed position with the forks 45 being disposed between the grid elements 52. The frame 42 is then moved upwardly and the forks 45 lift the skeleton and the parts 28 from the surface of the workpiece support table 16 since they are now supported on the fork assemblies 44*a*, 44*b*. At this point in time, the motion unit 20 has been engaged by the coupling device 90 to the loading unit 22, and the loading unit 22 has picked up a sheet workpiece 26.

Figure 8C:
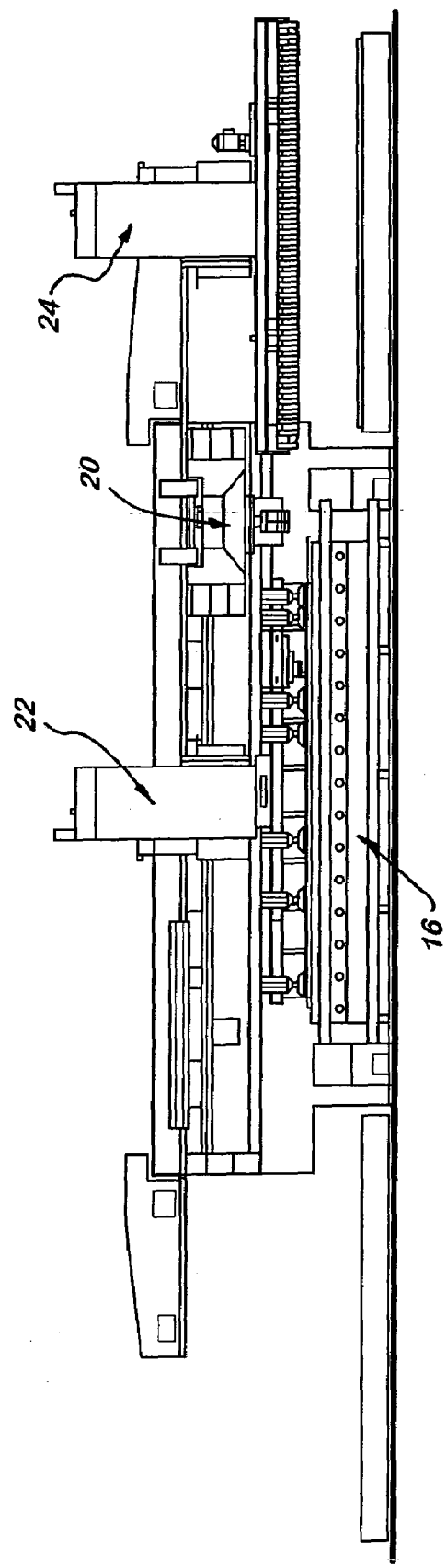
FIG. 8c is a similar view showing the loading unit after it has placed a fresh workpiece on the surface of the workpiece support table and the unloading unit has discharged the parts and skeleton.

FIG. 8*c* shows that the motion unit 20 has moved to the right in the drawing and it has also moved both units 22, 24. As a result, the unloading unit 24 is disposed over the platform 28. Operating the fork assemblies 44*a*, 44*b* to move them into their open position causes the parts and skeleton 26 to drop onto the platform 28. The workpiece 26 supported by the loading unit 22 is now moved downwardly to place it on the upper surface of the workpiece support table 16 and the suction is then terminated to release the workpiece 26.

Figure 8D:
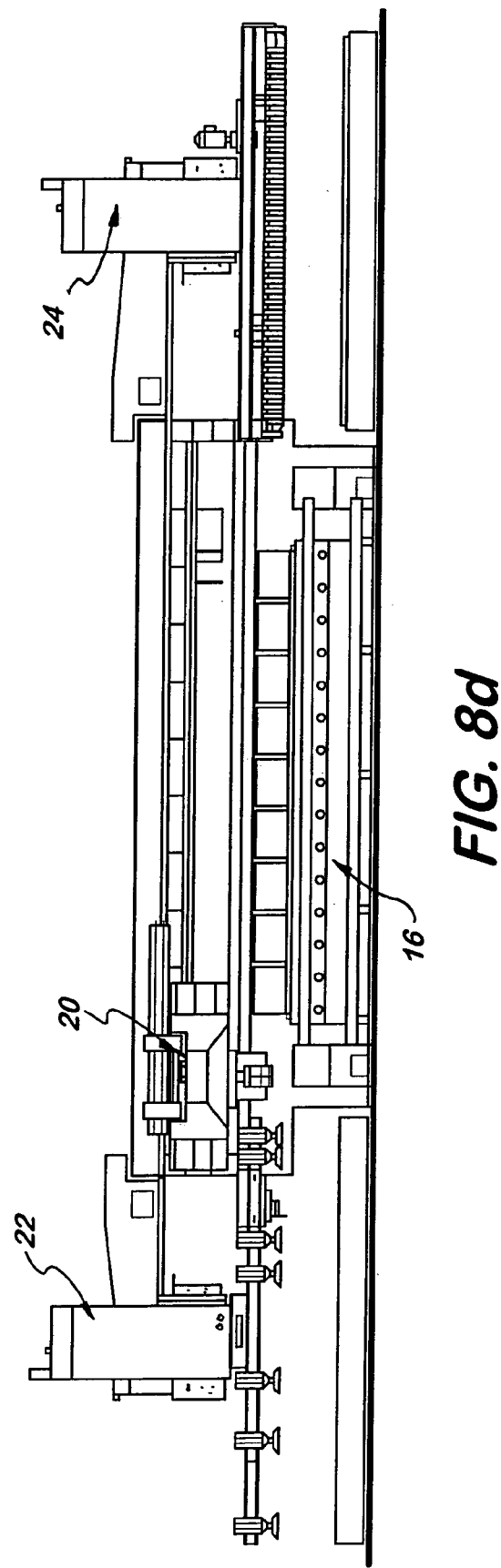
FIG. 8d is a similar view showing the components after the loading unit has been returned to its home position.

Turning next to FIG. 8*d*, the motion unit 20 has been unlatched from the coupling device 90 of the unloading unit 24, and it has moved the loading unit to its home position. The loading unit 22 has been latched into position and the coupling device 90 thereafter disengaged from the control unit 20.

As seen in FIG. 8*e*, the motion unit 20 is free from both units 22, 24 is now moved into its operative position over the workpiece 26 on the workpiece support table 16 and the guidance system now moves the motion unit 20 in the X-axis on the machine frame 10 and the laser cutting unit 76 in the Y-axis to effect the desired cutting operations upon the workpiece 26.

In the illustrated embodiment, the motion of the unloading unit is controlled by the motion of the motion unit, and the motion unit is easily coupled to and uncoupled from the unloading unit by its motion relative thereto. It will be appreciated that the unloading unit may be a stand alone unit in front of the workpiece support or movable into such a position where it can be moved relative to the workpiece support as described herein.

Thus, the laser cutting machine of the present invention has an unloading unit which may be readily fabricated, is easily operated with relative minimal programming, and is easily serviced.

The invention claimed is:

1. A machine tool installation for laser cutting of sheet metal workpieces comprising:
   (a) a workpiece support having a multiplicity of parallel spaced grid elements providing the upper surface thereof;
   (b) a machine frame having a generally vertical rear wall and an arm extending therefrom over said workpiece support, said grid elements of said workpiece support extending perpendicularly to said vertical wall of said machine frame, said vertical rear wall having a recess therein opening adjacent said workpiece support;
   (c) a laser cutting unit supported on said arm of said machine frame and including a laser cutting head, said cutting head being movable in X and Y axes over said workpiece support to cut parts from a sheet metal workpiece disposed thereon;
   (d) an unloading unit for lifting the cut parts from said workpiece support and transporting them to a discharge station, said unloading unit having (i) a frame movably supporting (ii) a pair of opposed fork assemblies, (iii) a fork housing supporting said frame and enclosing (iv) a drive assembly for moving said fork assemblies between open and closed positions, said fork assemblies being spaced apart in the open position and having their opposed ends in adjacent relationship in the closed position, one of said fork assemblies being movable into said frame recess in said open position, said fork assemblies in said closed position being movable vertically between said grid elements of said support to lift the parts from said grid elements, said unloading unit also having (iv) a support housing on which said fork housing is mounted for vertical movement, and (v) drive means for effecting vertical movement of said fork housing relative to said machine frame and said workpiece support, said unloading unit being movable on said machine frame between an operative position adjacent said workpiece support and the discharge station;
   (e) drive means for moving said unloading unit between the operative position and discharge station; and
   (f) a controller operable to (i) move said unloading unit between said discharge station and said operative position, (ii) move said fork assemblies into the open position, move said fork housing downwardly to position the fingers for movement into the spacing between said grid elements, (iii) move said fork assemblies into the closed position below the upper surface of said workpiece support, (iv) move said unloading unit upwardly to lift the cut parts and skeleton from said workpiece support, and (v) discharge the parts and skeleton on said unloading unit at the discharge station.

2. The machine tool installation in accordance with claim 1 wherein said fork assemblies are comprised of a multiplicity of forks cooperatively dimensioned to move into the spacing between said grid elements and below the parts and skeleton on the upper surface of said grid elements.

3. The machine tool installation in accordance with claim 2 wherein said forks are of generally C-shaped configuration.

4. The machine tool installation in accordance with claim 1 wherein said drive assembly includes a motor and a chain drive connected to said fork assemblies.

5. The machine tool installation in accordance with claim 1 wherein the parts and skeleton are deposited at the discharge station by moving said fork assemblies into the open position.

6. The machine tool installation in accordance with claim 1 wherein said vertical rear wall of said frame has a multiplicity of said recesses therein opening adjacent said workpiece support and line which one fork assembly is movable when the fork assemblies are moved into their open position, said open position enabling the fork assemblies to be moved downwardly on opposite sides of said workpiece support to a position in which the forks can move between the grid elements when the fork assemblies are moved into the closed position.

7. A machine tool installation for laser cutting of sheet workpieces comprising:
  (a) a workpiece support having a multiplicity of parallel spaced grid elements providing the upper surface thereof;
  (b) a machine frame having a generally vertical rear wall and an arm extending therefrom over said workpiece support, said grid elements of said workpiece support extending perpendicularly to said vertical wall of said machine frame, said vertical rear wall having a recess therein opening adjacent said workpiece support;
  (c) a laser cutting unit supported on said arm of said machine frame and including a laser cutting head, said cutting head being movable in X and Y axes aver said workpiece support to cut parts from a sheet metal workpiece disposed thereon;
  (d) an unloading unit for lifting the cut parts from said workpiece support and transporting them to a discharge station, said unloading unit having (i) a frame movably supporting (ii) a pair of opposed fork assemblies, said fork assemblies being comprised of a multiplicity of forks of generally C-shaped configuration and cooperatively dimensioned to move into the spacing between said grid elements of said support and below the parts and skeleton on the upper surface of said grid elements, (iii) a fork housing supporting said frame and enclosing (iv) a drive assembly for moving said fork assemblies between open and closed positions, said fork assemblies being spaced apart in the open position and having their opposed ends in adjacent relationship in the closed position to lift the parts from said grid elements of said workpiece support, one of said fork assemblies being movable into said frame recess in said open position, said unloading unit also having (iv) a support housing on which said fork housing is mounted for vertical movement, and (v) drive means for effecting vertical movement of said fork housing relative to said machine frame and said workpiece support, said unloading unit being movable on said machine frame between an operative position adjacent said workpiece support and the discharge station;
  (e) drive means for moving said unloading unit between the operative position and discharge station; and
  (f) a controller operable to (i) move the unloading unit between said discharge station and said operative position (ii) move said fork assemblies into the open position and the fork housing downwardly to position the fingers for movement into the spacing between the grid elements, (iii) move said fork assemblies into the closed position below the upper surface of said workpiece support, (iv) move said unloading unit upwardly to lift the cut parts and skeleton from said workpiece support, and (v) discharge the parts and skeleton on said unloading unit at the discharge station.

8. The machine tool installation in accordance with claim 7 wherein said drive assembly includes a motor and a chain drive connected to said fork assemblies.

9. The machine tool installation in accordance with claim 7 wherein the parts and skeleton are deposited at the discharge station by moving said fork assemblies into the open position.

10. A machine tool installation for laser cutting of sheet workpieces comprising:
  (a) a workpiece support having a multiplicity of parallel spaced grid elements providing the upper surface thereof;
  (b) a machine frame having a generally vertical rear wall and an arm extending therefrom over said workpiece support, said grid elements of said workpiece support extending perpendicularly to said vertical wall of said machine frame, said vertical rear wall of said frame has a multiplicity of recesses therein opening adjacent said workpiece support;
  (c) a laser cutting unit supported on said arm of said machine frame and including a laser cutting head, said cutting head being movable in X and Y axes over said workpiece support to an parts from a sheet metal workpiece disposed thereon;
  (d) an unloading unit for lifting the cut parts from said workpiece support and transporting them to a discharge station, said unloading unit having (i) a frame movably supporting (ii) a pair of opposed fork assemblies, (iii) a fork housing supporting said frame and enclosing (iv) a drive assembly for moving said fork assemblies between open and closed positions, said fork assemblies being spaced apart in the open position and having their opposed ends in adjacent relationship in the closed position, said unloading unit also having (iv) a support housing on which said fork housing is mounted for vertical movement, and (v) drive means for effecting vertical movement of said fork housing relative to said machine frame and said workpiece support, said unloading unit being movable on said machine frame between an operative position adjacent said workpiece support and the discharge station, one fork assembly being movable into said recesses in said frame rear wall when the fork assemblies are moved into their open position to enable the fork assemblies to be moved downwardly on opposite sides of said workpiece support to a position in which the forks can move between the grid elements when the fork assemblies are moved into the closed position, said fork assemblies being comprised of a multiplicity of forks cooperatively dimensioned to move into the spacing between said grid elements and below the parts and skeleton on the upper surface of said grid elements, and said forks being of generally C-shaped configuration;
  (e) drive means for moving said unloading unit on said machine frame between the operative position and discharge station; and
  (f) a controller operable to (i) move the unloading unit between said discharge station and said operative position (ii) move said fork assemblies into the open position and the fork housing downwardly to position the fingers for movement into the spacing between the grid elements, (iii) move said fork assemblies into the closed position below the upper surface of said workpiece support, (iv) move said unloading unit upwardly to lift the cut parts and skeleton from said workpiece support, and (v) discharge the parts and skeleton on said unloading unit at the discharge station.

11. The machine tool installation in accordance with claim 10 wherein said drive assembly includes a motor and a chain drive connected to said fork assemblies.

12. The machine tool installation in accordance with claim 10 wherein the parts and skeleton are deposited at the discharge station by moving said fork assemblies into the open position.

* * * * *